United States Patent [19]

Liepse

[11] Patent Number: 4,642,184
[45] Date of Patent: Feb. 10, 1987

[54] FRYER FILTER AND PUMP

[76] Inventor: Donald E. Liepse, Rte. #3, Mexico, Mo. 65265

[21] Appl. No.: 708,705

[22] Filed: Mar. 6, 1985

[51] Int. Cl.⁴ ............................................. B01D 35/26
[52] U.S. Cl. .................... 210/240; 210/416.5; 210/470; 210/473; 210/DIG. 8
[58] Field of Search ................ 210/DIG. 8, 470, 473, 210/416.1, 416.5, 456, 239, 240, 194, 251, 244, 167; 99/408

[56] References Cited

U.S. PATENT DOCUMENTS

| | | | |
|---|---|---|---|
| 36,530 | 9/1862 | Richardson | 210/416.1 |
| 2,338,417 | 1/1944 | Forrest et al. | 210/416.5 |
| 2,338,419 | 1/1944 | Forrest et al. | 210/416.5 |
| 2,432,073 | 12/1947 | Hargen | 210/416.1 |
| 2,902,161 | 9/1959 | Humbert, Jr. et al. | 210/DIG. 8 |
| 2,953,097 | 9/1960 | Pappas | 210/416.5 |
| 3,263,818 | 8/1966 | Gedrich | 210/416.1 |
| 3,355,026 | 11/1967 | Schut | 210/416.5 |
| 3,356,218 | 12/1967 | Grudoski | 210/416.5 |
| 3,415,181 | 12/1968 | Hart | 99/408 |
| 3,477,361 | 11/1969 | Bradshaw | 210/167 |

*Primary Examiner*—Benoit Castel
*Assistant Examiner*—Linda S. Evans
*Attorney, Agent, or Firm*—Grace J. Fishel

[57] ABSTRACT

A device is provided for removing particles formed in the deep fat frying of foodstuffs in liquefied grease which pumps the mixture of liquefied grease and the particles suspended therein from a deep fat fryer and delivers the mixture to a filter and provides for the return of the liquefied grease filtrate to the deep fat fryer or for its transfer to a storage container.

4 Claims, 6 Drawing Figures

U.S. Patent     Feb. 10, 1987     4,642,184
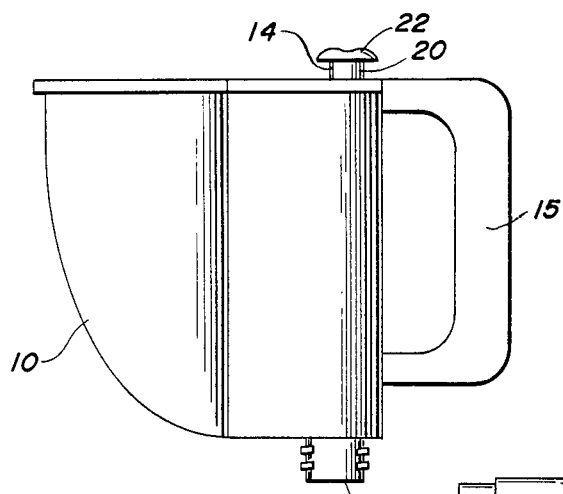
FIG. 1
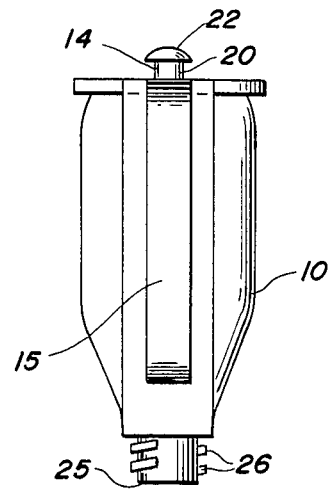
FIG. 2
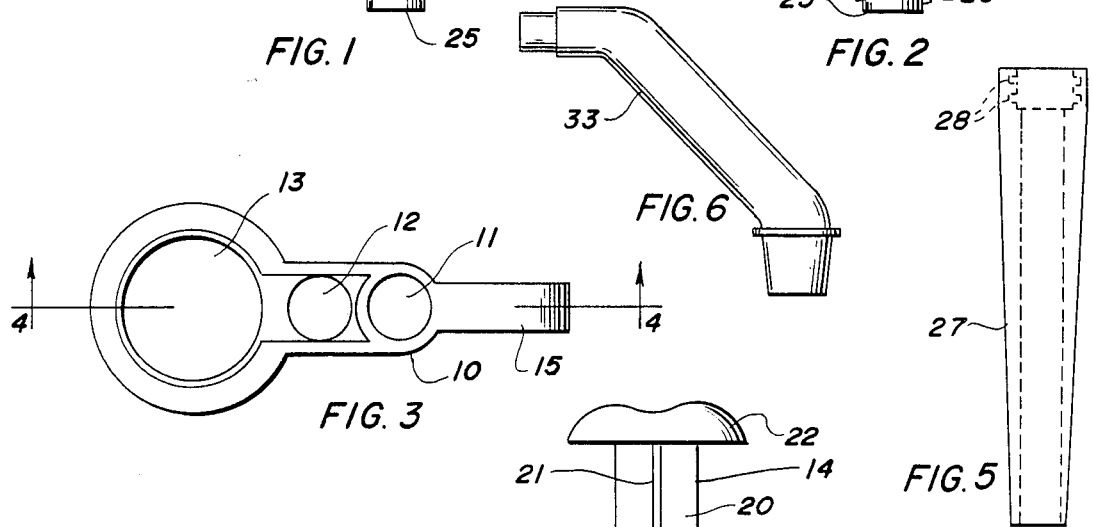
FIG. 3
FIG. 6
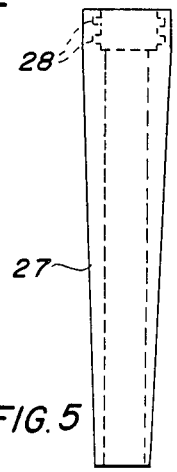
FIG. 5
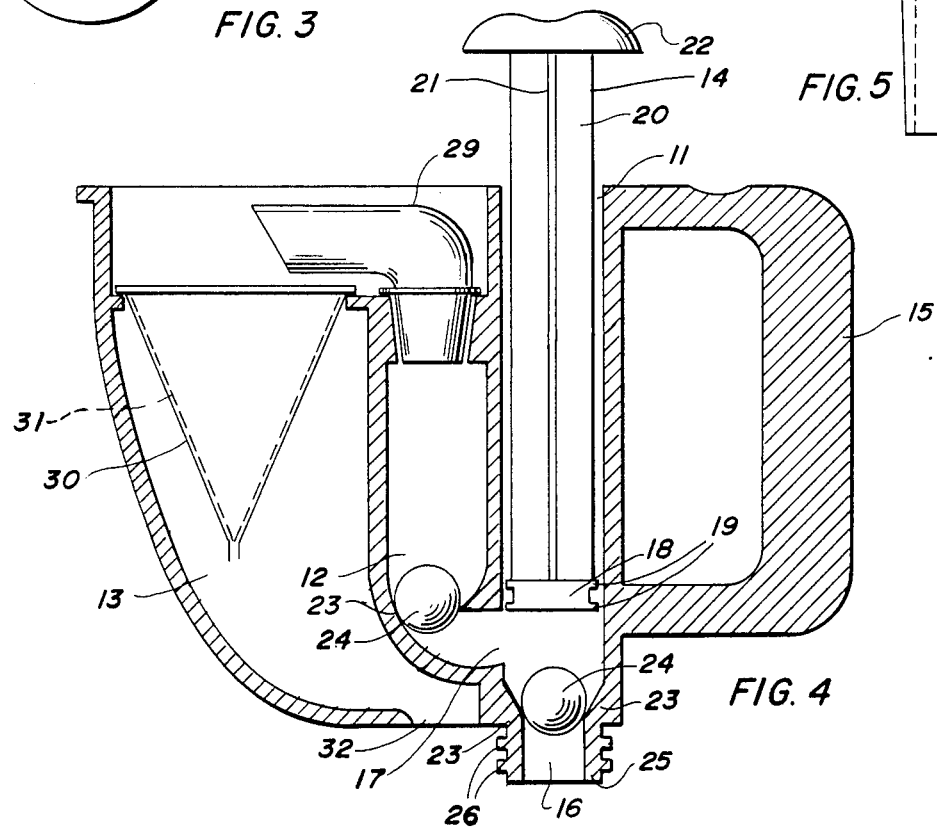
FIG. 4

FRYER FILTER AND PUMP

This invention relates to a dual function kitchen utensil which can be used to filter residual food particles from molten or liquefied grease without removing the grease from the user's fryer and, if desired, can then be used to transfer the previously filtered grease to a storage container.

BACKGROUND OF THE INVENTION

During frying, particularly deep fat frying in liquid grease such as molten lard or cooking oil, particles of food separate from the food being fried and become suspended in the liquid grease. These particles burn on further frying and, at some point, prevent the further use of the grease. Even if they do not burn, if they are left in the grease and it is stored, they tend to turn the grease rancid and make it unsuitable for further use.

There is no existing kitchen utensil which provides a safe means to filter grease. A wire strainer can be used but this requires the user to pour the hot grease out of the fryer through the strainer and into a container. At the end of this operation, the user must then pour the hot grease back into the fryer if he prefers to store it there.

Several years ago, small sized deep fat fryers were popular because cooking grease is frequently only used once for the reasons mentioned above. These little fryers, however, tend to sit on the shelf unused since they do not address the real problem which would be solved if there was an effective way of filtering the grease.

Devices for filtering food liquids are shown in U.S. Pat. Nos. 36,530 and 2,432,073. However, none of the devices disclosed in these patents or otherwise in use is particularly adapted to filtering particles of food from liquid grease in a deep fat fryer (herein referred to as "fryer") and returning the filtered grease to the fryer or to another container.

SUMMARY OF THE INVENTION

In view of the above, it is an object of the present invention to provide a dual function fryer filter and pump for separating food particles from liquid grease and returning the filtered grease to either the fryer or another container. It is another object to provide a fryer filter and pump which is hand operated and which is easily disassembled for cleaning. Other objects and features will be in part apparent and in part pointed out hereinafter. The invention accordingly comprises the structures hereinafter described, the scope of the invention being indicated by the subjoined claims.

In accordance with the present invention there is provided a device for withdrawing from a fryer a mixture of liquid grease and particles suspended therein, removing the particles by filtration, and either returning the liquefied grease filtrate to the fryer or transferring the grease to a storage container. The fryer filter and pump of the present invention is a three-chambered utensil comprising a receiving chamber, a transfer chamber and a filter chamber. The receiving chamber contains a pumping means for effecting the transfer of the mixture of liquefied grease and the particles suspended therein, and is provided with an extension for immersion into the liquefied grease in the fryer. A first port communicates the receiving chamber and the fryer and a second port communicates the receiving and transfer chambers, normally closed valves are present in the receiving and transfer chambers to prevent any back-flow of the liquefied grease through the ports. The transfer chamber includes means, preferably removable, to direct the grease into a filter present in the filter chamber or to direct the filtered grease into a storage container. An outlet in the filter chamber provides means for delivering the filtered grease to the fryer. Preferably, the device is an injected molded body and is also provided with a handle of integral construction.

BRIEF DESCRIPTION OF THE DRAWINGS

In the drawings, in which one of several possible embodiments of the invention is illustrated, corresponding reference characters refer to corresponding parts and in which:

FIG. 1 is a side elevational view of the device of this invention;

FIG. 2 is a back elevational view thereof;

FIG. 3 is a top plan view thereof with the pumping means and transfer means removed;

FIG. 4 is a sectional view taken along line 4—4 in FIG. 3, but showing the pumping and transfer means;

FIG. 5 is a side elevational view of an extension tube; and,

FIG. 6 is a side elevational view of a delivery tube for filtered grease.

DESCRIPTION OF THE PREFERRED EMBODIMENTS

Referring to the drawings more particularly by reference character, device 10 of the present invention is a three-chambered unit comprised of a receiving chamber 11, a transfer chamber 12 and a filter chamber 13. Receiving chamber 11 includes a pumping means 14 serving as a sucking pump for lifting the liquefied grease from the fryer into receiving chamber 11 and as a forcing pump for forcing the grease into transfer chamber 12. Device 10 includes a handle 15 and is constructed of any suitable material inert to liquefied grease and is preferably dishwasher safe.

As shown, receiving chamber 11 is cylindrical with an inlet port 16 communicating the liquid grease in the fryer and an outlet port 17 communicating transfer chamber 12. Pumping means 14 comprise a tightly fitting piston 18 with integrally formed double gaskets 19 reciprocatingly mounted to a piston rod 20 having longitudinally extending ribs 21. Piston rod 20 extends through receiving chamber 11 for attachment to a handle 22 and ribs 21 serve as guides when rod 20 is reciprocated in receiving chamber 11.

Inlet port 16 includes a first normally closed valve which opens when grease is sucked by pumping means 14 into receiving chamber 11 and closes as a second normally closed valve opens when grease is forced by pumping means 14 through outlet port 17 into transfer chamber 12. In the embodiment shown in the drawings, transfer chamber 12, like receiving chamber 11, is a cylindrical cavity which is vertically disposed in use, the mouth of which is necked down into a valve seat 23. Each valve seat 23 is outfitted with a loose ball 24 which is weighted so as normally to be seated therein and which in combination therewith make up the aforementioned normally closed valves. Other normally closed valves, such as flap valves or the like may also be used.

A short extension 25 is affixed to receiving chamber 11 adjacent inlet port 16 and having a coarse screw thread 26 on its outer side. Removably screw threaded to this extension 25 is an extension tube 27, shown in FIG. 5, which has internal screw threading 28 at its attachment end to fit the screw threading 26 on extension 25. Extension tube 27 is selected of a length such that when device 10 is held over the grease to be filtered, the unattached end of extension tube 27 is immersed in the liquid grease.

Transfer chamber 12 includes transfer means 29, preferably a removable tube, for directing the mixture of liquid grease and the particles suspended therein into filter chamber 13. Filter chamber 13 includes a holder 30, such as a funnel, for a filtering material 31, such as filter paper, cheese cloth or the like. An outlet 32 in filter chamber 13 provides means for the passage of the liquid grease filtrate into the fryer. When tube 29 is removable, a second delivery tube 33, as shown in FIG. 6, can be provided as a replacement to which a length of tubing (not shown) may be attached for delivery of the filtered grease into another container for storage.

In use, device 10 is grasped by handle 15 and the unattached end of extension tube 25 is placed in the grease to be filtered. Upward movement of piston 18 in receiving chamber 11 opens the normally closed valve in inlet port 16, whereupon the liquid grease will flow past the first normally closed valve into the receiving chamber according to the extent of motion given to piston 18. The following downward stroke of piston 18 puts pressure on the liquid grease in receiving chamber 11 closing opened valve in inlet port 16 and opening the normally closed valve in outlet port 17 and forcing the liquid into transfer chamber 12. As this is done, the mixture of liquefied grease or cooking oil with the particles suspended therein flows through transfer tube 29 onto filter materials 31 in filter chamber 13. The particles are retained on filter 31 and the liquefied grease filtrate flows through the opening at the bottom of the filter chamber 32 back into the fryer. If it is desired to transfer the liquefied grease to a storage container after it has been filtered, transfer tube 29 is removed and is replaced by delivery tube 33 by-passing the filter which is attached by means of tubing to a storage container. The liquefied grease obtained after passage through the filter is free of particles and does not turn rancid such that is can be reused without any problems. After use, filtering material 31 is preferably discarded and device 10 may be readily disassembled for cleaning.

In view of the above, it will be seen that the several objects of the invention are achieved and other advantageous results attained. As various changes could be made in the above structures without departing from the scope of the invention, it is understood that all matters contained in the above description shall be interpreted as illustrative and not in a limiting sense.

What is claimed is:

1. A hand held device for removing particles formed in deep fat frying of foodstuffs from liquefied grease contained in a fryer comprises a three-chambered unit with a handle, the chambers being a receiving chamber, a transfer chamber and a filter chamber having a filter, an inlet port with a ball check valve communicating the liquefied grease in the fryer with the receiving chamber and an outlet port with a ball check valve communicating the receiving chamber with the transfer chamber, said ball check valves weighted and positioned such that they are normally closed in upright condition and normally open when the device is inverted, a piston pumping means in the receiving chamber for sucking liquefied grease from the fryer into the receiving chamber and forcing it into the transfer chamber, the transfer chamber including means for directing the flow of the liquefied grease and the particles suspended therein onto the filter, and an opening in the filter chamber for return of the liquefied grease filtrate to the fryer, said means for directing the flow of liquefied grease and the particles suspended therein onto the filter includes a removable tube whereby the flow of liquefied grease by-passes the filter.

2. The device of claim 1 wherein the receiving chamber and the transfer chamber are cylindrical.

3. The device of claim 2 having a detachable extension tube attached to the inlet port, the unattached end of which is immersed in the liquefied grease in the fryer to be filtered.

4. The device of claim 1 wherein the receiving chamber is cylindrical and wherein the pumping means comprise a piston and a piston rod, said piston rod having guide means along its length for guiding the piston in the receiving chamber as it is reciprocated by the piston rod.

* * * * *